Patented Feb. 16, 1932

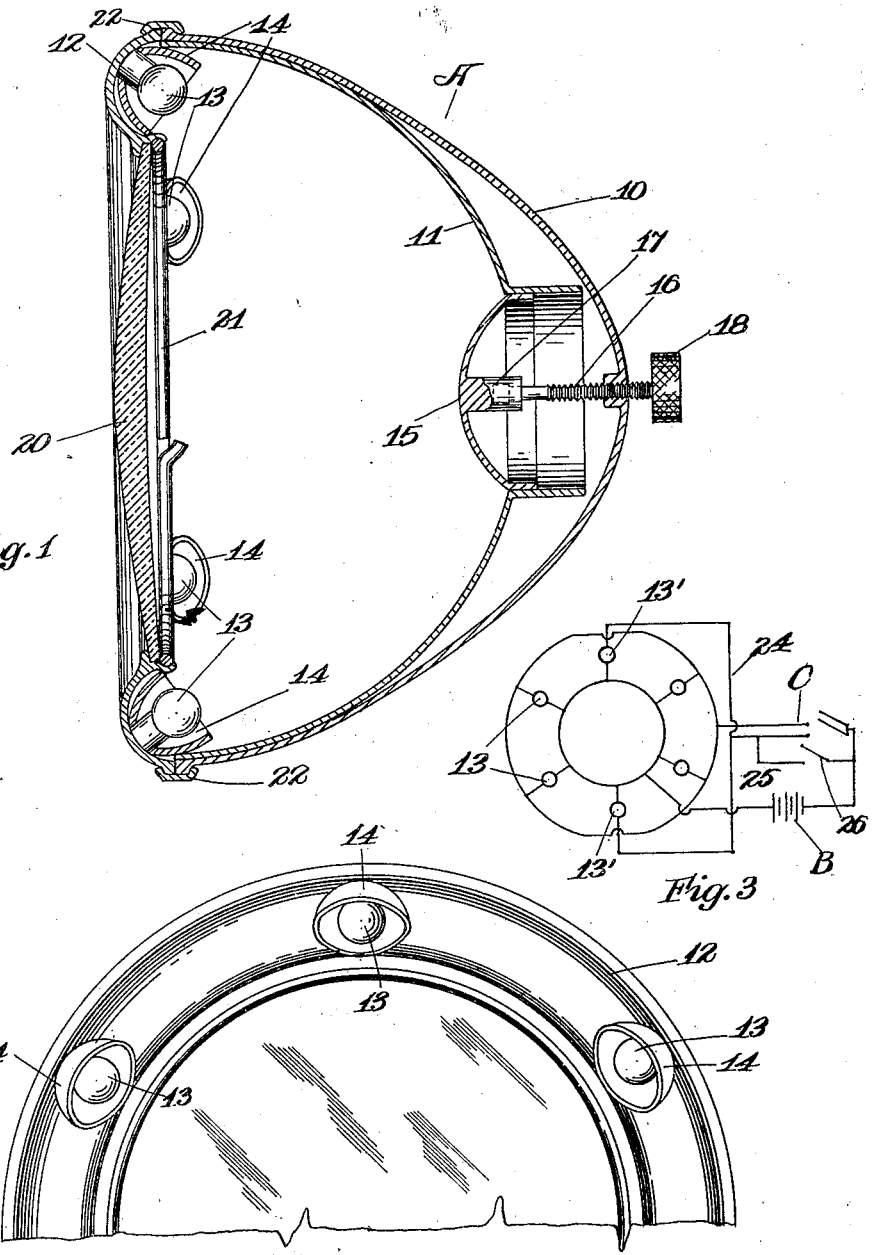

1,845,628

UNITED STATES PATENT OFFICE

WILLIAM A. ROTH, OF ST. PAUL, MINNESOTA, ASSIGNOR, BY DIRECT AND MESNE ASSIGNMENTS, OF ONE-THIRD TO TREW F. POOLE, OF ST. PAUL, MINNESOTA, AND ONE-THIRD TO HENRY J. ROTH, OF NEW LONDON, MINNESOTA

LIGHT

Application filed July 30, 1928. Serial No. 296,116.

My invention relates to lights and is particularly applicable to headlights for automobiles or other vehicles wherein it is desired to provide a means of giving a good clear road light without having any glare or objectionable blinding features which are so apparent in the ordinary headlights on automobiles and motor vehicles used today.

I have endeavored to provide in my headlight a means of projecting light without a glare and having a soft, white, non-glaring strong light which may be projected in a beam on to the road and yet having none of the objectionable blinding glaring features.

A feature of my invention resides in a headlight wherein a series of light bulbs are positioned within the outer rim of the same, not visible from the front of the headlight and which are provided with reflectors adapted to project the light on to the reflecting portion of the headlight which in turn is projected by a suitable lens out on to the road.

It is also a feature of my invention to provide a headlight having a series of auxiliary bulbs placed within the rim of the lamp casing wherein elliptical reflectors are used to project the light on to a reflecting means within the headlight casing. My invention further includes an adjustable reflecting means positioned within the headlight casing which may be adjusted to focus the light which is to be projected out of the headlight by means of a lens of a suitable nature and character.

Further my invention includes a means of providing a series of bulbs for a headlight and wherein some of the bulbs may be turned off so that only other of the bulbs are used when less light is desired, all of the bulbs being so positioned as to be invisible from the front of the headlight.

My headlight is formed with a casing wherein the rim is provided with a structure so as to form a recess into which light bulbs may be positioned concealing the bulbs from view outside of the casing, and thus preventing any direct glare from the filament of the lamps. This formation of my headlight casing provides a neat headlight structure and permits the use of a lens which would ordinarily be prohibitive on a headlight where the light bulbs were positioned in a manner so as to be visible through the lens. The advantage of this structure is that a lens can be used to project a beam of light out on to the road in a much more effective way than in lamps where strong projecting lenses are prohibitive.

These features and other details and objects will be also set forth and pointed out in the specification and claims.

In the drawings forming part of my specification:

Figure 1 is a sectional side view of my light projector applicable as a headlight for automobiles.

Figure 2 illustrates an inside view of the front bulbs concealing rim, only half of which is illustrated.

Figure 3 is a wiring diagram which shows the manner in which my headlight can be operated in use.

My headlight is illustrated in the drawings in a form which may be used as a headlight for motor vehicles.

My headlight A is formed with an outer rear casing portion 10 of a somewhat elliptical shape which is adapted to support the reflector 11 within the same.

The headlight A is provided with a light bulb concealing front rim 12 in which the light bulbs 13 are positioned in a manner so as to be entirely concealed when viewing the headlight A from the front.

The rim 12 supports the electric bulbs 13 and each of these bulbs is provided with an elliptically shaped reflector 14 which is so positioned as to direct the light from the reflectors 14 on to a point on the adjustable reflecting surface 15 of the reflector 11. The adjustable reflecting surface may be adjusted to be at the focus point of the reflectors 14.

The adjustable reflector portion 15 is formed convex and is positioned in the apex portion of the reflector 11. This adjustable reflector surface 15 is adjusted by the adjusting screw 16 which is pivotally supported at 17 to the back of the reflector surface 15, while the other end of the adjusting screw 16 is formed with a knurled operating head 18. This structure permits the reflector surface 15 to be adjusted into proper focal position with the bulbs 13. The rim 12 is adapted to support the projecting lens 20 which is held by the spring wire member 21 in position in the rim 12. This lens 20 may be of a sufficiently strong nature so as to project a beam of light from the reflecting surface 11 and the reflector surface 15. The surfaces 11 and 15 are of a non-glaring material and may be of a white nature so as to give off a soft diffused white light. Thus the light picked up by the lens 20 is projected out into a soft non-glaring light or beam which would have no glaring effect and would not be objectionable but rather would tend to clearly light up the road with a strong, evenly diffused light.

The elliptical shape of the reflectors 14 behind the bulbs 13 will permit the light from the bulbs 13 to be focused and concentrated on to a point on the reflecting surface 15. This permits a strong light to be projected on to the reflecting surface 15 and which may be picked up by the lens 20 to be projected out on to the road.

The rim 12 is held removable to the front of the headlight A by means of the member 22 by any suitable means for holding the rim in contact with the casing portion 10. The reflectors 14 are adjustable in relation to the bulbs 13 in any suitable manner and the bulbs 13 replaceable in the ordinary well known manner.

I have illustrated in Figure 3 a wiring diagram showing the bulbs 13 connected with the battery B and by means of the switch C all of the bulbs may be thrown on. I have illustrated six bulbs in this diagram but it is obvious that any number of bulbs may be used, but I have also illustrated in this wiring diagram for the convenience of describing the use of my headlight a circuit showing top and bottom bulbs 13' connected by the wire 24 and the wire 25 with the switch 26 which permits the top and bottom bulbs 13' to be used independent of the other four lights illustrated in the wiring diagram. Thus in using my headlight A as a parking light or when not as great a light is desired as is necessary in ordinary driving, then the switch 26 may be used independent of the switch C so as to use the bulbs 13'.

It is an important feature of my invention to consider that my headlight A is designed to give a strong clear well diffused light having no glaring effect but of a nature to light up the road and which can be projected in a strong beam by the lens 20 without any of the undesirable effects of a glaring light which cannot be projected by a lens in the manner in which I accomplish with my light. Lenses of the type that I use in my headlight could not be used in headlights where a strong glaring reflector is employed. With my headlight A more candle power may be used owing to the fact that there are no glaring or dazzling effects from the projection of the light reflectors 11 and 15 and the lens 20 is of a nature to concentrate the light into a beam which is projected forwardly on the road the proper distance to provide an excellent driving light.

In accordance with the patent statutes I have described the principles of operation of my headlight A and while I have described the same as more particularly adapted to motor vehicle headlights and the like, I desire to have it understood that this is only suggestive and that my headlight may be used for other purposes and that obvious changes may be made to anyone skilled in the art within the scope of the following claims without departing from the spirit of the invention.

I claim:

1. A headlight comprising a casing, a lens and front rim closing the casing, a concave reflector within the casing and provided with a central aperture, a convex reflector extending through the aperture in the concave reflector, a plurality of light sources concealed within the front rim and placed substantially in a plane close to the rear face of the lens, individual reflectors for said light sources positioned so as to direct the light from the light sources on the convex reflector, and adjusting means for said convex reflector to slidably adjust the same along the axis of the concave reflector.

2. A headlight comprising a casing, a lens and front rim closing the casing, a concave reflector within the casing and provided with a central aperture, a convex reflector extending through the aperture in the concave reflector, a plurality of light sources concealed within the front rim and placed substantially in a plane close to the rear face of the lens, and individual reflectors for said light sources positioned so as to direct the light from the light sources on the convex reflector.

WILLIAM A. ROTH.